(12) United States Patent
Nakazawa

(10) Patent No.: US 9,628,667 B2
(45) Date of Patent: Apr. 18, 2017

(54) IMAGE SCANNING APPARATUS

(71) Applicant: BROTHER KOGYO KABUSHIKI KAISHA, Nagoya-shi, Aichi-ken (JP)

(72) Inventor: Hiroyuki Nakazawa, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/082,159

(22) Filed: Mar. 28, 2016

(65) Prior Publication Data
US 2016/0295070 A1    Oct. 6, 2016

(30) Foreign Application Priority Data

Mar. 30, 2015 (JP) ................................. 2015-068200

(51) Int. Cl.
H04N 1/04 (2006.01)
H04N 1/40 (2006.01)
H04N 1/028 (2006.01)

(52) U.S. Cl.
CPC ....... *H04N 1/40056* (2013.01); *H04N 1/0281* (2013.01); *H04N 1/4005* (2013.01); *H04N 2201/0094* (2013.01)

(58) Field of Classification Search
CPC ............ H04N 1/40056; H04N 1/0282; H04N 1/4072; H04N 1/4076
USPC ..... 358/446, 445, 483, 482, 461; 250/208.1; 382/312
See application file for complete search history.

(56) References Cited

U.S. PATENT DOCUMENTS

| 5,121,230 A * | 6/1992 | Honma | H04N 1/4076 358/494 |
| 5,592,310 A * | 1/1997 | Sugiura | H04N 1/40012 358/501 |
| 8,541,730 B2 * | 9/2013 | Inuiya | H01L 27/14634 250/208.1 |
| 2003/0099000 A1 * | 5/2003 | Hiromatsu | H04N 1/4076 358/461 |
| 2004/0105135 A1 | 6/2004 | Sawada | |

(Continued)

FOREIGN PATENT DOCUMENTS

JP    2003-298813 A    10/2003
JP    2013-042377 A    2/2013

*Primary Examiner* — Cheukfan Lee
(74) *Attorney, Agent, or Firm* — Merchant & Gould P.C.

(57) ABSTRACT

In a scanning apparatus, a controller is configured to obtain black reference data, compensated data based on digital data (scan data) by scanning a reference member with the light source turned off, and the black reference data. The controller further compares the compensated data with a first particular value. The controller executes the compensated data obtaining process with setting the light amount adjustment value to be a smaller value when the compensated data is greater than the first particular value, while with setting the light amount adjustment value to be a greater value when the compensated data is less than the first particular value. Further, the controller sets the light amount adjustment value to be a scan-time light amount adjustment value when the light amount adjustment value is equal to the first particular value. Then, the controller executes a scanning process according to the scan-time light amount adjustment value.

5 Claims, 7 Drawing Sheets

(56) References Cited

U.S. PATENT DOCUMENTS

2010/0142009 A1\* 6/2010 Tsukahara ............ H04N 1/4072
358/475
2013/0044338 A1 2/2013 Nikaku \* cited by examiner

IMAGE SCANNING APPARATUS

This application claims priority under 35 U.S.C. §119 from Japanese Patent Application No. 2015-068200 filed on Mar. 30, 2015. The entire subject matter of the application is incorporated herein by reference.

BACKGROUND

Technical Field

The present disclosures relate to an image scanning apparatus.

Related Art

Generally, in an image scanning apparatus, light amount adjustment of a light source of an image scanning device is executed before scanning images. There has been known an image scanning apparatus which is configured to obtain image signals for one scanning line in a main scanning direction by synthesizing outputs of multiple sensor chips which are arranged in the main scanning direction. In such an image scanning apparatus, due to individual differences of output buffers respectively provided to the multiple sensor chips or the like, a black level of pixels may be different among the sensor chips. When the sensor chips are CMOS (complementary metal-oxide semiconductor) sensors, the output buffers are provided for respective pixels, and due to individual difference among respective output buffers, the black level of respective pixels may be different.

SUMMARY

For example, an example of a conventional image scanning apparatus is configured to obtain a first image signal of a particular pixel output by a scanning device in accordance with a received light that is reflected from a reference white member when a light source is controlled to emit light having a first light amount, and a second image signal of the particular pixel output by the scanning device in accordance with a received light that is reflected from the white reference member when the light source is controlled to emit light having a second light amount. The conventional image scanning apparatus calculates a third light amount value, which is a target light amount value, based on a difference between the first and second image signals and a difference between the first and second light amounts and making use of a proportional relationship between a change of light amount and a change of the image signals. Since the black level of the image signals (i.e., the first and second image signals) corresponding to a same pixel remain to be the same, by calculating a difference between the first and second image signals, effect of the black level can be eliminated. According to such a conventional image scanning apparatus, even if there are variations among the black levels, adjustment of the light amount can be done.

However, in order to calculate the third light amount value, scanning operations to scan the reference white member by illuminating the same with the light having the first light amount and the second light amount should be performed. That is, two scanning operations should be done before calculating the light mount adjustment value (i.e., the third light amount value), and a relatively long period is required in the light amount adjustment operation.

In consideration of the above, aspects of the disclosures provide an improved image scanning apparatus which is capable of executing the light amount adjustment without requiring such a long period as in the conventional apparatus even if there are variations among black levels.

According to aspects of the disclosures, there is provided a scanning apparatus, which is provided with a reference member arranged on a conveying passage through which an original sheet subject to scan is conveyed, a scanning device configured to scan an image on the original sheet when the original sheet passing the reference member, the scanning device including a light source and a light receiver configured receive reflected light which is light emitted by the light source and reflected by the original sheet, a convertor configured to covert analog signals output by the scanning device into digital data for respective pixels in one line of the scanning device, a compensator configured to calculate compensation data based on the digital data and the black reference data, the compensation data being data removing variation of the black reference data of respective pixels from the digital data, a setting device configured to set a light amount setting value used to adjust the light amount of the light emitted by the light source, and a controller. The controller is configured to execute a black reference data obtaining process in which the controller obtains the digital data by scanning the reference member with the light source turned off as the black reference data, a compensated data obtaining process in which the controller obtains compensated data based on the digital data which is obtained by scanning the reference member according to the light amount setting value with the light source turned off, and the black reference data, and a light adjustment process in which the controller compares the compensated data with a first particular value. Further, when the compensated data is greater than the first particular value, the controller executes the compensated data obtaining process with setting the light amount adjustment value to be a smaller value, and when the compensated data is less than the first particular value, the controller executes the compensated data obtaining process with setting the light amount adjustment value to be a greater value. The controller further sets the light amount adjustment value to be a scan-time light amount adjustment value which is used for scanning when the light amount adjustment value is equal to the first particular value, and executes a scanning process in which the controller causes the light source to emit light according to the scan-time light amount adjustment value.

BRIEF DESCRIPTION OF THE ACCOMPANYING DRAWINGS

Figure 3:
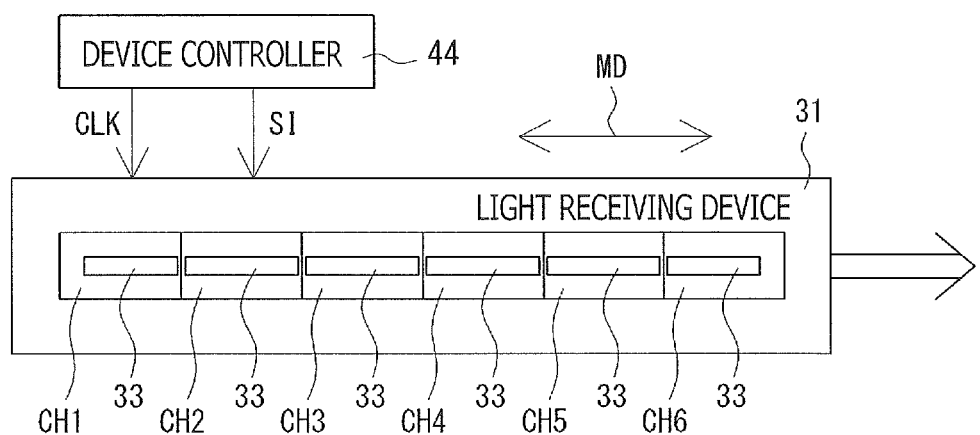

FIG. 3 schematically shows a configuration of a light receiving device of the scanning device according to an illustrative embodiment of the disclosures.

Figure 4:
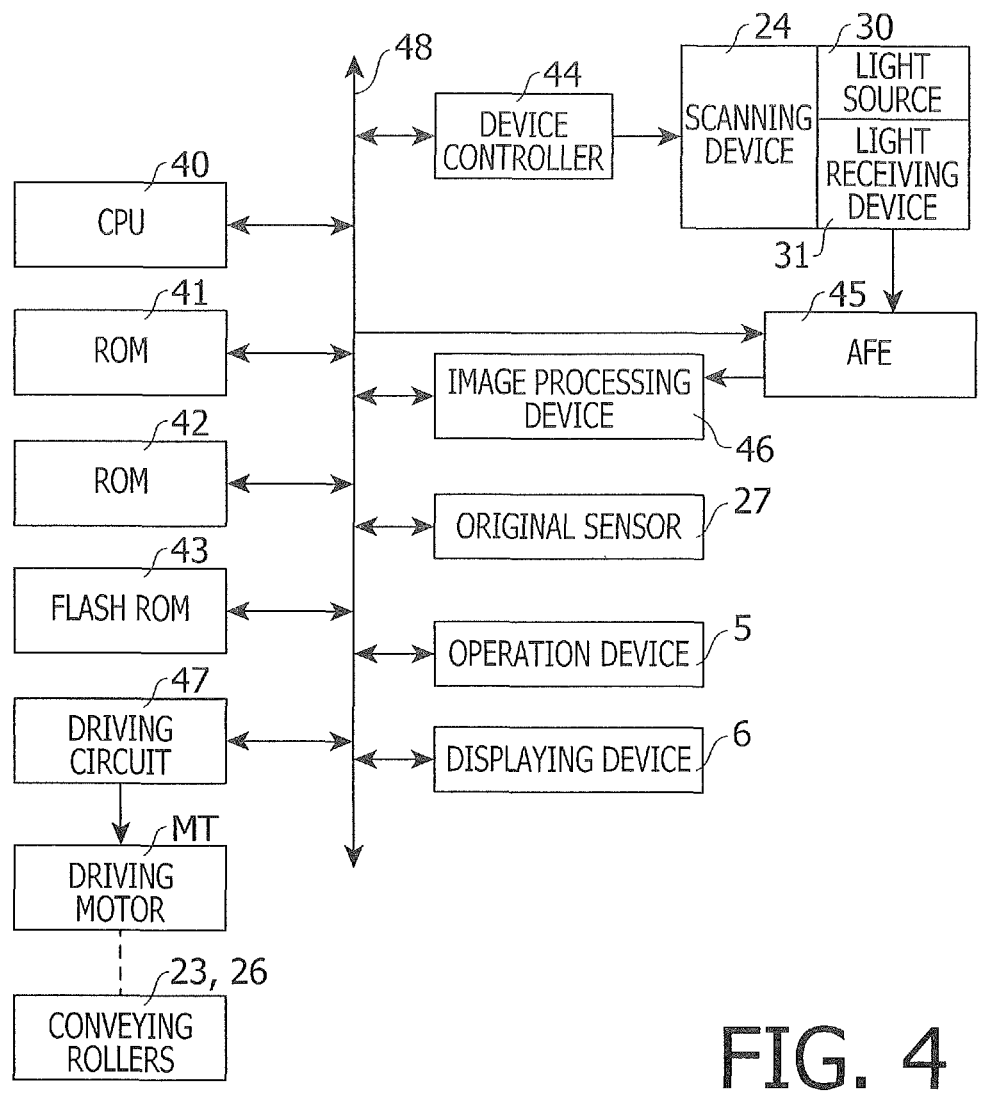

FIG. 4 is a block diagram showing an electrical configuration of an image processing device according to an illustrative embodiment of the disclosures.

Figure 5:
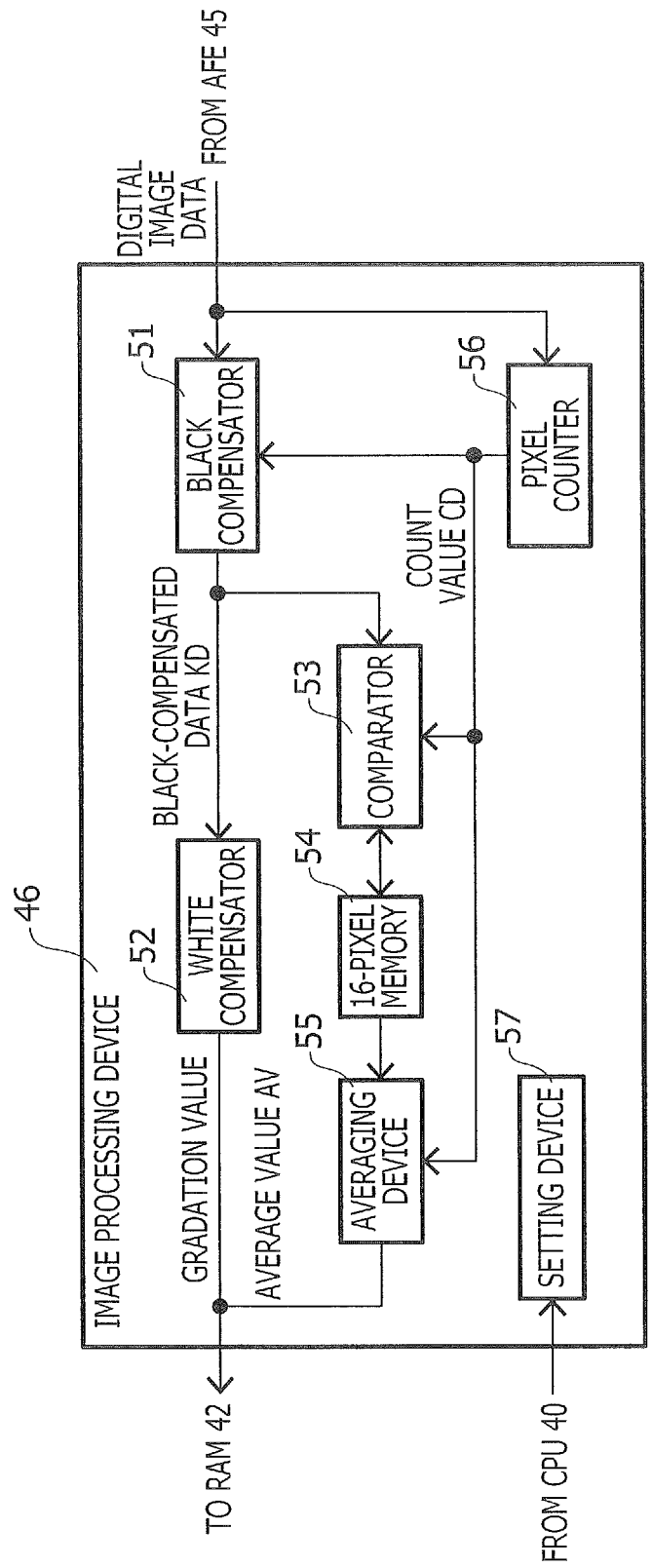

FIG. 5 is a block diagram showing a configuration of the image processing device according to an illustrative embodiment of the disclosures.

Figure 6:
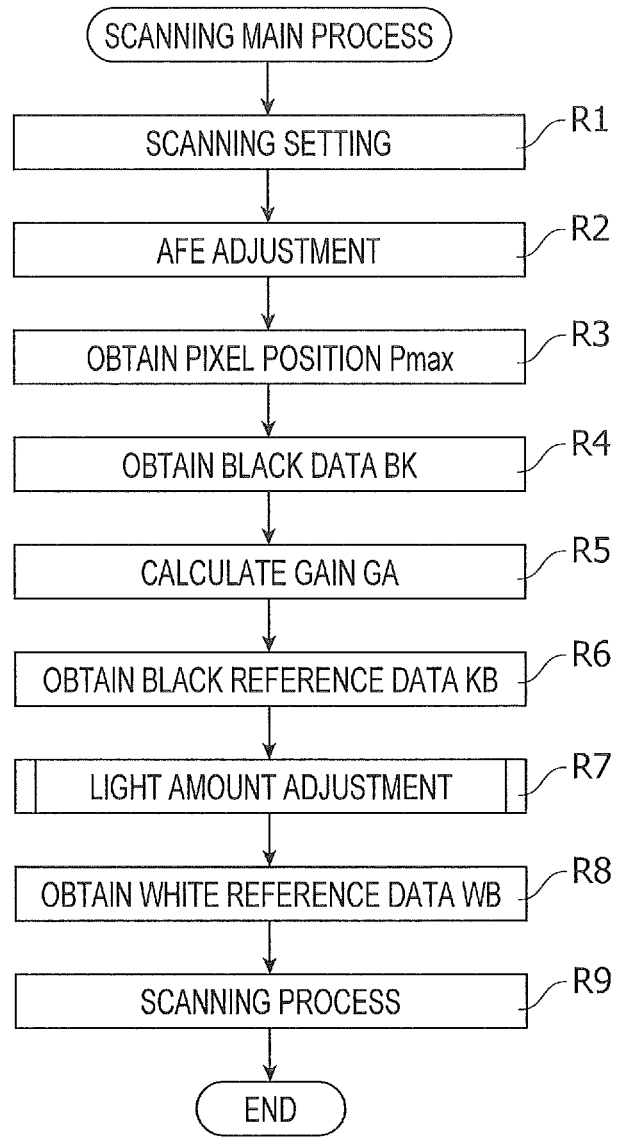

FIG. 6 is a flowchart illustrating a scanning main process according to an illustrative embodiment of the disclosures.

Figure 7:
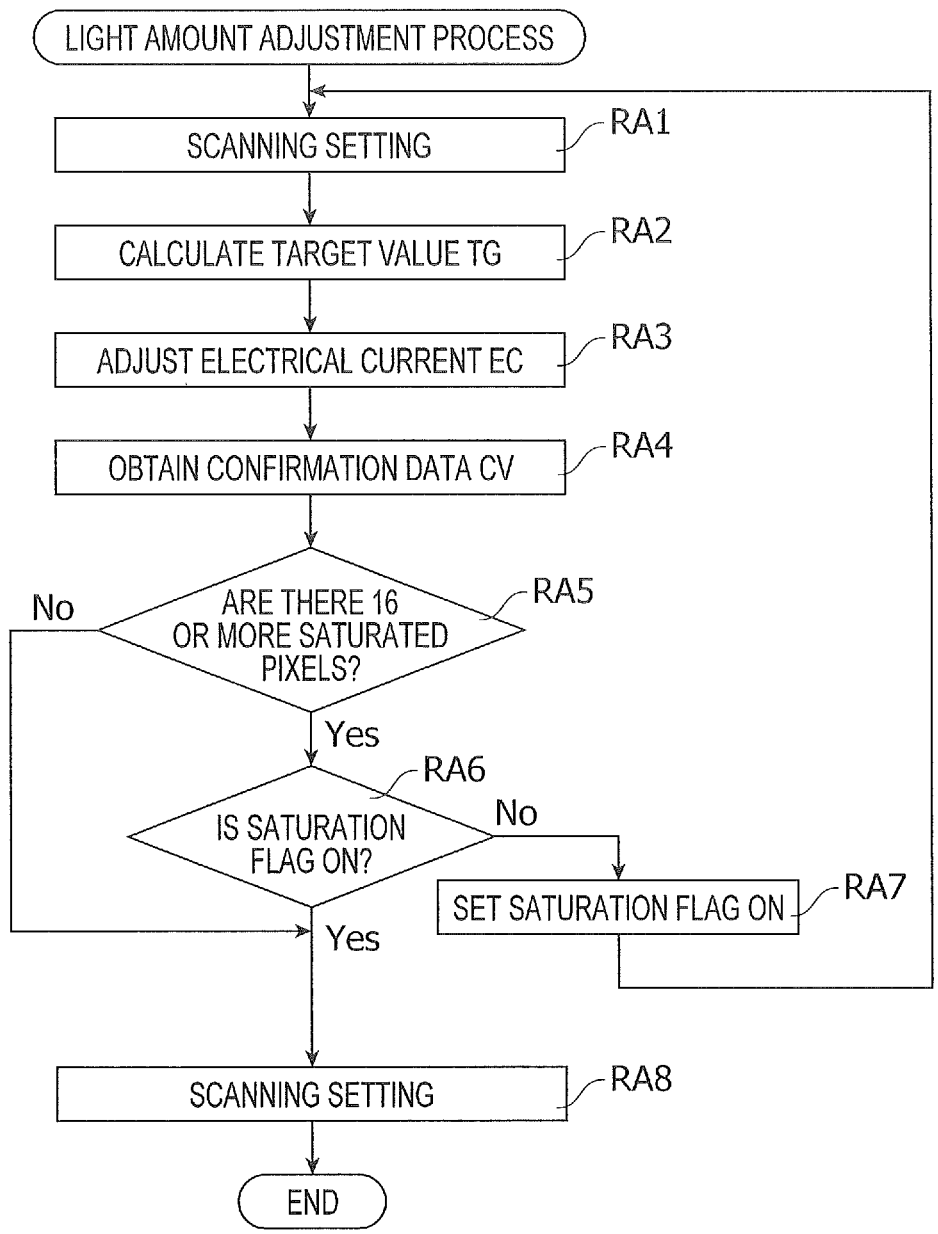

FIG. 7 is a flowchart illustrating a light amount adjustment process according to an illustrative embodiment of the disclosures.

Figure 8:
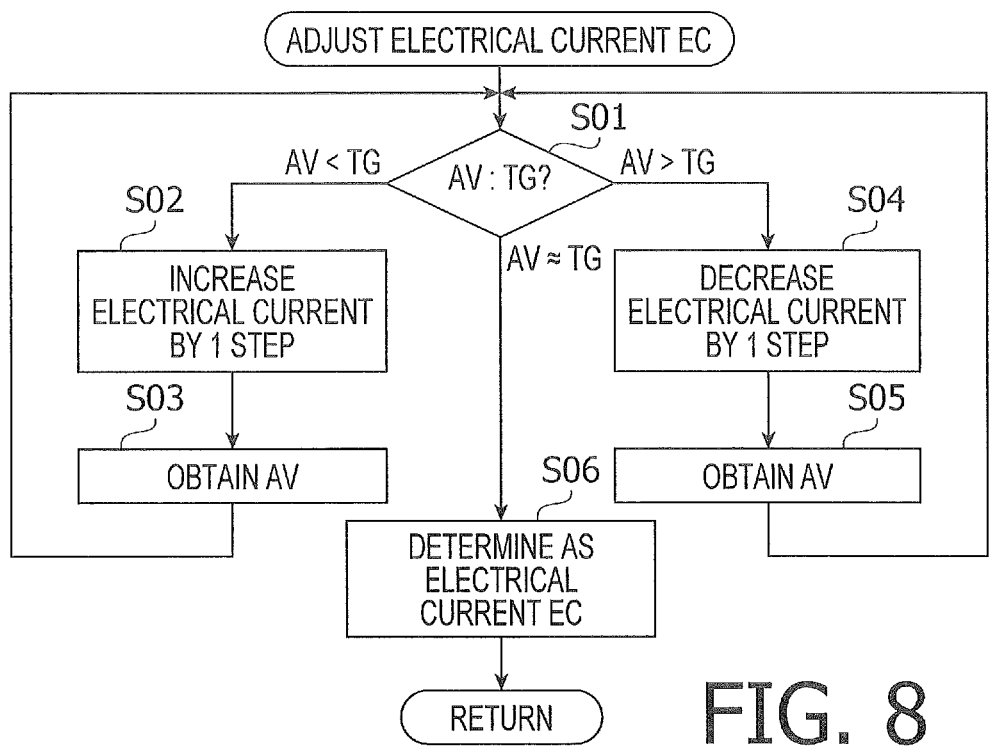

FIG. 8 shows a flowchart illustrating an exemplary process of adjusting the electrical current value which is called in the light amount adjustment process shown in FIG. 7.

Figure 9:
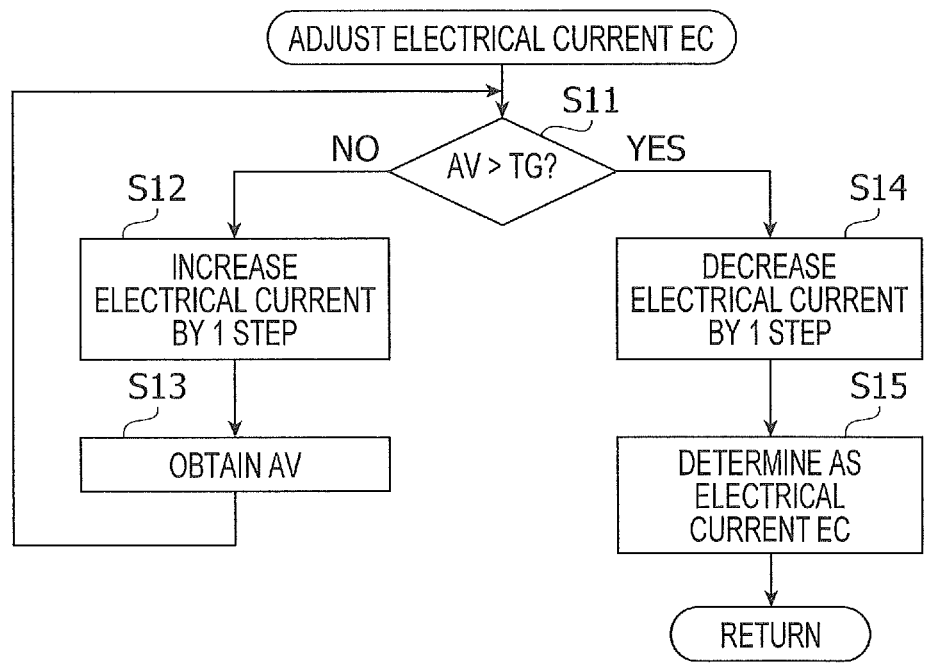

FIG. 9 is a flowchart illustrating a simplified process of adjusting the electrical current value shown in FIG. 8.

DESCRIPTION OF EMBODIMENTS

Figure 1:
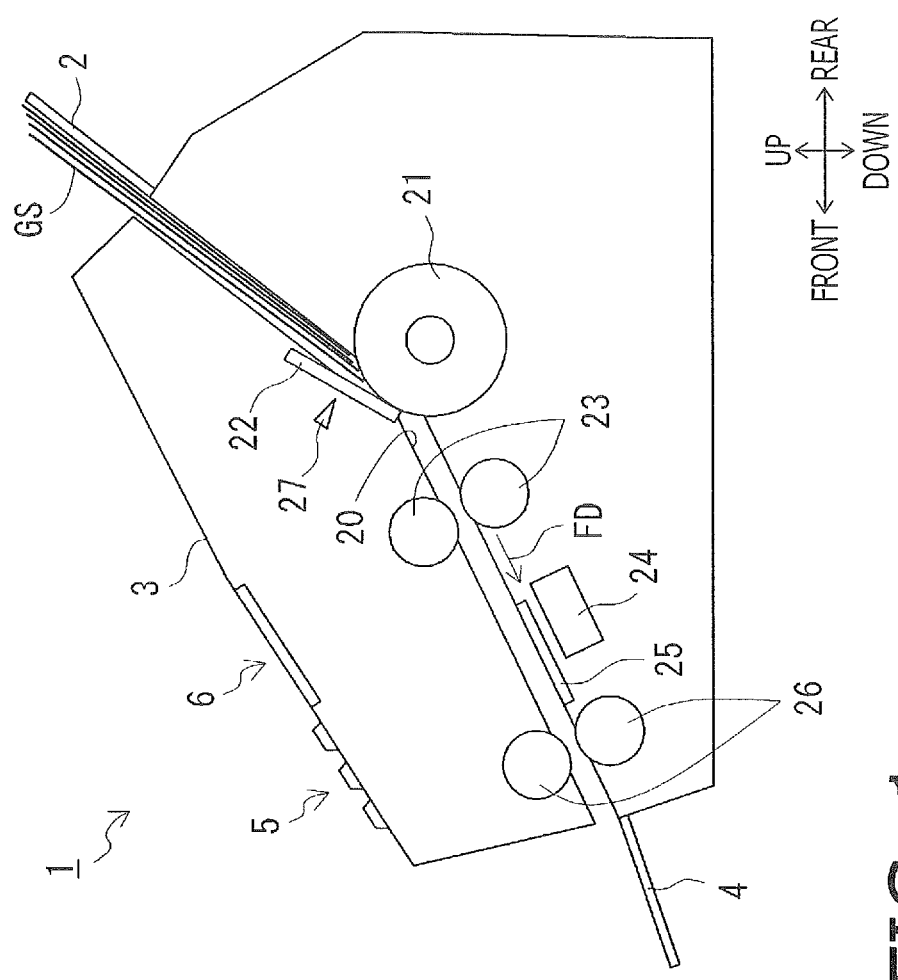
FIG. 1 is a side view schematically showing inner configuration of an image scanning apparatus according to an illustrative embodiment of the disclosures.

Hereinafter, referring to the accompanying drawings, an image scanning apparatus 1 according to an illustrative embodiment of the disclosures will be described. In FIG. 1, front, rear, up and down directions when the image scanning apparatus is normally in use are defined by arrows. In the following description, directions will be indicated referring to those indicated in FIG. 1. It is noted that the directions indicated here are for the purpose of description and are not intended to be interpreted in a limited manner.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

<Mechanical Configuration of Image Scanning Apparatus>

The image scanning apparatus 1 has, as shown in FIG. 1, a sheet feed tray 2, a main body 3 and a catch tray 4. Further, an operation device 5 and a display device 6 are arranged on an upper surface of the main body 3. The operation device 5 is provided with a power switch and setting buttons, with which a user inputs operation commands. For example, the operation device 5 includes a start button which is to be operated when a certain operation is to be started. The display device 6 has an LCD (liquid crystal display) and displays operation status and the like of the image scanning apparatus 1.

A conveying path 20 is defined inside the main body 3. The original sheets GS placed on the sheet feed tray 2 are conveyed in a forward direction FD along the conveying path 20, and finally discharged onto the catch tray 4. As shown in FIG. 1, a sheet feed roller 21, a separation pad 22, an upstream roller pair 23, a scanning device 24, a platen glass 25 and a downstream roller pair 26 are arranged along the conveying path 20.

The sheet feed roller 21 is configured, in association with the separation pad 22, to feed multiple original sheets GS placed on the sheet feed tray 2 to the conveying path 20 one by one. The upstream roller pair 23 and the downstream roller pair 26 are driven by a driving motor MT (see FIG. 4) to rotate. The platen glass 25 has optical transparency and arranged along the conveying path 20 on a lower side thereof. The roller pairs 23 and 26 convey the original sheet GS fed by the sheet feed roller 21 so as to pass over the platen glass 25.

According to the illustrative embodiment, the original sheets GS are placed on the sheet feed tray 2 such that a face to be scanned (hereinafter, referred to as an object face) of each original sheet GS faces downward. The scanning device 24 is arranged below the conveying path 20 so as to scan an image on the object face of the original sheet GS upon passage thereof above the platen glass 25. A sheet sensor 27 is arranged to the sheet feed tray such that the sheet sensor 27 is turned on when the original sheets GS are placed on the sheet feed tray 2, while turned off when there is no original sheet GS on the sheet feed tray 2.

<Description on Scanning Device>

Figure 2:
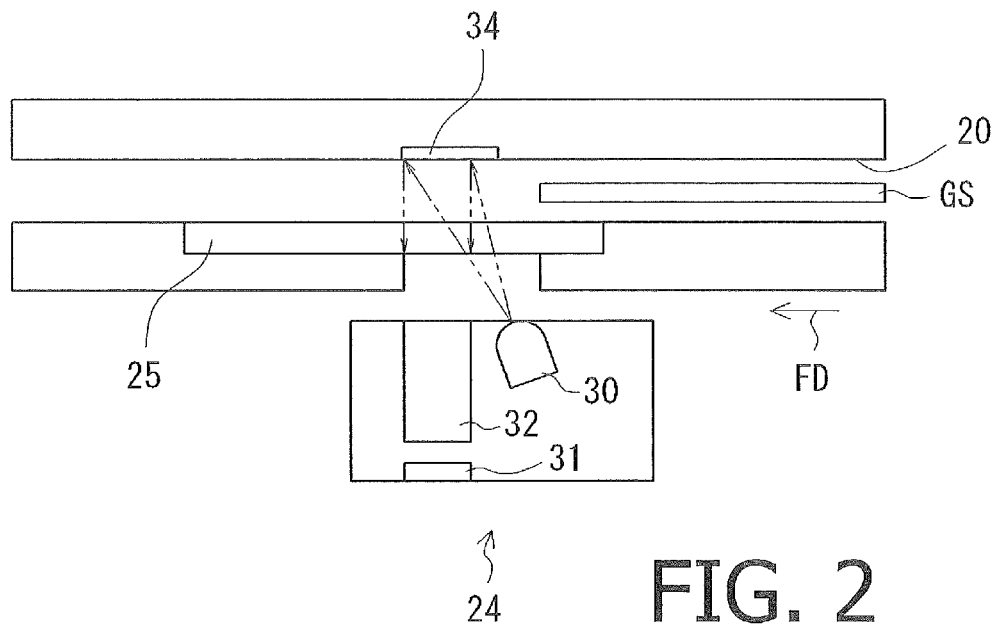
FIG. 2 is an enlarged view schematically showing a scanning device of the image scanning apparatus shown in FIG. 1 according to an illustrative embodiment of the disclosures.

The scanning device 24 has a light source 30, a light receiving device 31 and an optical element 32 (see FIG. 2). The light source 30 includes three kinds of (i.e., red, blue and green) light emitting diodes (LEDs). The light emitted by the light source 30 is reflected by the object face or the like, and directed to the light receiving device 31 by the optical element 32. According to the illustrative embodiment, the LEDs configured to emit different colors are turned on sequentially such that an image of one line for each of red, blue and green colors is scanned sequentially. It is noted that a term "line" in this specification is defined as a line segment starting from a photoelectric conversion element outputting a signal corresponding to a top pixel to a photoelectric conversion element outputting a signal corresponding to a last pixel of a linearly extending image scanned by the LEDs for each color.

A white reference plate 34 is arranged at a position opposite to the scanning device 24 with the conveying path 20 in between. The white reference plate 34 has white reference density which is white reference reflectivity of white color that is a background color of the original sheets GS. When there is no original sheet GS in the conveying path 20, light emitted from the light source 30 is reflected by the white reference plate 34 as indicated by two-dotted arrow lines in FIG. 2, and converged by the optical element 32 and is incident on the light receiving device 31 (i.e., received by the light receiving device 31).

As shown in FIG. 3, according to the illustrative embodiment, the light receiving device 31 has six sensor IC (integrated circuit) chips CH1-CH6, which are arranged linearly in a direction MD. Hereinafter, the direction MD along which the sensor IC chips CH1-CH6 are arranged will be referred to as a main scanning direction MD. Each of the sensor IC chips CH1-CH6 has a plurality of photoelectric conversion elements 33 arranged in the main scanning direction MD, a shift register and an amplifier. Since such a configuration the sensor IC chip is well-known, description thereof is omitted for brevity. An example of such a configuration is disclosed, for example, in U.S. Pat. No. 7,312, 562 B2, disclosures thereof is incorporated herein by reference.

<Electrical Configuration of Image Scanning Apparatus>

As shown in FIG. 4, the image scanning apparatus 1 has a CPU 40, a ROM 41, a RAM 42, a flash ROM 43, a device controller 44, an AFE (analog front end) 45, an image processing device 46 and a driving circuit 47. The above components are connected to the operation device 5, the display device 6 and the sheet sensor 27 through a bus 48.

The ROM 41 is used to store programs for causing the image scanning apparatus 1 to execute various operations including a scanning main process (described later), subroutines called in the scanning main process and the like. The CPU 40 controls each component in accordance with programs retrieved from the ROM 41. The flash ROM 43 is a rewritable non-volatile memory and stores various pieces of data generated/retrieved during various control operations by the CPU 40, for example, reference data which is used as reference data when a black compensation and a white compensation. The RAM 42 is used to temporarily store calculation results and the like.

The device controller 44 is connected to the scanning device 24, and transmits a signal to control the light source 30 to the scanning device 24 in accordance with the light amount adjustment value which is set based on a command output by the CPU 40. Further, the device controller 44 transmits a clock signal CLK and a line signal SI to the light receiving device 31 to sequentially operate the plurality of sensor IC chips of the light receiving device 31. The clock signal CLK is a signal representing timings at which the plurality of photoelectric conversion elements. The line signal SI is a signal representing output timing for each line. In response to receipt of a lighting control signal from the device controller 44, the scanning device 25 turns on the light source 30 and transmits an analog signal corresponding to the light amount the light receiving device 31 received to the AFE 45. The device controller 44 has a setting device configured to set the light amount setting value.

The AFE 45 is connected to the scanning device 24 and executes an offset adjustment to apply offset to the analog signal transmitted from the scanning device 24 in accordance with AFE adjustment value which is set based on a command by the CPU 40, a gain adjustment to apply gain conversion to the analog signal, and converts the analog signal to which the offset and the gain conversion have been applied to digital image data with use of an A/D (analog-to-digital) convertor. Since the A/D convertor has been conventionally know, description there will be omitted for brevity.

The AFE 45 has a particular resolution. For example, if the AFE 45 is configured to process 8-bit data, the AFE 45 can process data of which gradation level has a range from 0 to 255. In the above case, the AFE 45 converts the analog signal transmitted from the scanning device 24 to 8-bit (i.e., 0-255) gradation data as the digital image data. The digital image data converted by the AFE 34 is transmitted to the image processing device 46. According to the illustrative embodiment, a conversion voltage range of the A/D convertor is 3.0 volts. A maximum variable voltage, which is a variable voltage from black output to white output by the analog signal output by the scanning device 24, is 1.5 volts. It is noted that the gain for the gain adjustment is set based on the AFE setting value.

As shown in FIG. 5, the image processing device 46 has a black compensator 51, a white compensator 52, a comparator 53, a 16-pixel memory 54, an averaging device 55, a pixel counter 56 and a setting device 57.

When start of scanning is set to the setting device 57, the pixel counter counts the number of input of digital image data of one pixel for each line, thereby generating a count value CD representing an order of a pixel from the top pixel within one line.

If the pixel counter 56 detects input of the digital image data when the currently set count value CD is equal to a last pixel number set to the setting device 57, the pixel counter 56 sets zero (0), which represents a start of a line, as the count value CD.

If the pixel counter 56 detects input of the digital image data when the set count value CD does not coincide with the last pixel number, the pixel counter 56 sets the count value CD to an updated count number by incrementing the current count value CD by one. The thus generated count value CD generated by the image counter 56 is transmitted to the black compensator 51, the comparator 53 and the averaging device 55. The last pixel number is set to the setting device 57.

The black compensator 51 calculates black-compensated data KD by applying black compensation to the digital image data based on black reference data KB. According to the illustrative embodiment, when the count values CD from zero to the last pixel number are input, the black compensator 51 calculates the black-compensated data KD by subtracting the black reference data KB from the digital image data input from the AFE 45 at the same pixel position. The black-compensated data KD calculated by the black compensator 51 is transmitted to the white compensator 52 and the comparator 53. The black reference data KB is digital image data of each pixel within one line when the white reference plate 34 is scanned with the light source 30 being turned off.

The white compensator 52 calculates a gradation value by applying white compensation to the black-compensated data KD based on white reference data WB. According to the illustrative embodiment, when the count values CD from zero to the last pixel number are input, the white compensator 51 calculates the gradation value by dividing a value of the black-compensated data KD by a shading data value which is calculated from the white reference data WB and the black reference data KB at the same pixel position, and by multiplying the quotient by 255 (i.e., the gradation value corresponding to white color). The white reference data WB is digital image data of each pixel within one line when the white reference plate 34 is scanned with the light source 30 being driven to emit the light so that an average of values of the image data corresponds to a target value TG, which will be described later.

If the digital image data input to the image processing device 46 is the same as the white reference data WB, the gradation value of 255, which represents white color, is output. If a setting value to output the black-compensated data KD is set to the setting device 57, the white compensator 52 transmits the black-compensated data output by the black compensator 51 to the RAM 42. If a setting value to output the digital image data is set to the setting device 57, the black compensator 51 and the white compensator 52 transmit the digital image data output by the AFE 45 to the RAM 42.

The 16-pixel memory 54 is configured to store the black-compensated data KD for 16 pixels. The comparator 53 is configured to erase data in the 16-pixel memory 54 when the count value CD is zero. Further, the comparator 53 stores the black-compensated data KD, which is input to the comparator 53, in the 16-pixel memory 54 when the count value CD is 15 or less. When the count value CD is greater than 15, the comparator 53 compares the value of the input black-compensated data KD with 16th greatest value of the black-compensated data stored in the 16-pixel memory 54.

When the value of the input black-compensated data KD is greater than the 16th greatest value of the black-compensated data stored in the 16-pixel memory 54, the latter is replaced with the former. That is, the input black-compensated data KD replaces black-compensated data KD having the 16th greatest value in the 16-pixel memory 54. When the value of the input black-compensated data KD is equal to or less than the 16th greatest value of the black-compensated data KD stored in the 16-pixel memory 54, the input black-compensated data KD is not stored in the 16-pixel memory 54.

When the count value CD of the last pixel number which is set to the setting device 57 is input, the averaging device 55 averages the values of the black-compensated data KD for 16 pixels stored in the 16-pixel memory 54 to obtain an averaged value AV. The image processing device 46 executes the image processing in accordance with the setting values stored in the setting device 57, and stores the digital image data, black-compensated data, the gradation values and/or average value AV in the RAM 42. The black reference data KB and the white reference data WB used in the above compensation are set to the image processing device 46. According to the illustrative embodiment, the maximum value of the white reference data WB is equal to the maximum value of the digital image data. Further, since the 16-pixel memory 54 stores the black-compensated data having relatively greater values, the data stored in the 16-pixel memory 54 may be regarded as dimmed black-compensated data.

The driving circuit 47 is connected to the driving motor MT and drives the same in accordance with a driving command transmitted from the CPU 40. The driving circuit 47 rotates the driving motor MT in accordance with a rotation amount and a rotation direction instructed by the driving command. When the driving motor MT rotates by a particular amount, the sheet feed roller 21 and the conveying rollers 23 and 26 rotate by a particular angle, thereby the original sheet GS being conveyed along the conveying path 20 by a particular distance.

<Operation of Illustrative Embodiments>

The image scanning apparatus 1 executes the scanning main process shown in FIG. 6. Specifically, steps R1-R9 and a subroutine in the scanning main process shown in FIG. 6 are executed by the CPU 40. It is noted that R1, R2, ..., respectively represent step numbers. That is, R1 is step R1, R2 is step R2, ... and the like.

<Scanning Main Process>

The scanning main process is started when the user places the original sheets GS on the sheet feed tray 2, and depresses the start button of the operation device 5. When the scanning main process is started, the CPU 40 executes a scanning setting (R1). According to the illustrative embodiment, when the scanning main process is started, the CPU 40 sets a particular scanning start pixel position RFP and a particular scanning end position REP to the AFE 45. Then, the CPU 40 sets the last pixel number to the image processing device 46.

Next, the CPU 40 executes an offset adjustment of the AFE 45 (R2). For example, the CPU 40 sets the gain of the AFE 45 to one. Then, the CPU 40 offsets the analog signal and executes the offset adjustment of the AFE 45 so that the minimum value of the digital image data.

Next, the CPU 40 obtains the pixel position (R3). According to the illustrative embodiment, the CPU 40 turns on the light source 30 with setting the light amount adjustment value to cause the light source 30 to emit light having the particular light amount IT, and scans the white reference plate 34. The CPU 40 obtains the positions of the 16 pixels as pixel positions Pmax in the descending order from among the values of one line of scanned image data. Then, the CPU 40 stores the obtained pixel positions Pmax in the RAM 42. It is noted that, according to the illustrative embodiment, the light mount IT is 80% of light amount ST, which will be described later.

The CPU 40 obtains the back data BK (R4). That is, the CPU 40 sets the light amount adjustment value to a value for turning off the light source 30, and scans the white reference plate 34. The CPU 40 obtains the digital image data of each pixel within one line as the back data BK.

Next, the CPU 40 calculates the gain of the AFE 45 (R5). That is, the CPU 40 calculates the gain GA of the AFE 45 such that a voltage variation of the analog signal at the pixel position of Pmax is 1.5 volts which is the maximum variation voltage of the scanning device 24. According to the illustrative embodiment, the maximum data value of the digital image data output by the AFE 45 becomes a target value of 255 in the light amount adjustment process described later. Accordingly, the gradation variation amount of the value of the digital image data from the black output to the white output at the pixel position of Pmax is a value calculated by subtracting an average values of the black data BK at the pixel position Pmax from the target value of 255.

The voltage variation amount in the A/D convertor corresponding to the gradation variation amount is calculated by dividing the gradation variation amount by the maximum resolution of 255 of the AFE 45, and then multiplying the quotient with 3.0 volts which is a conversion voltage range of the A/D convertor. Hereinafter, the voltage variation amount will also be referred to as converted voltage value.

Thus, the gain GA is calculated by dividing the converted voltage value by 1.5 volts. That is, the CPU 40 calculates a value by subtracting the average value of the black data BK at the pixel position of Pmax from 255, then divides the result of subtraction by 255, and multiplies the result of division with two (2) to obtain the gain GA. Then, the CPU 40 sets the gain GA to the AFE 45.

Next, the CPU 40 obtains the black reference data KB (R6). That is, the CPU 40 sets the light amount adjustment value so as to turn off the light source 30 and scans the white reference plate 34. The CPU 40 obtains the digital image data of each pixel within one line as the black reference data KB. Then, the CPU 40 sets the black reference data KB to the image processing device 46, and stored the same in the flash ROM 43.

The CPU 40 executes the light amount adjustment of the light source 30 (R7). Then, the CPU 40 makes a setting to the image processing device 46 to output the average value AV.

The CPU 40 calculates the target value TG by subtracting a value of the black reference data KB at the pixel position Pmax from 255 that is the maximum value of the digital image data. Next, the CPU 40 adjusts an electrical current flowing through the light source 30 so that the average value AV is the target value TG, and determines an electric current EC that results in the light amount ST. The CPU 40 sets the setting value to output the gradation value to the image processing device 46.

Next, the CPU 40 sets 255 which is the maximum value of the digital image data to the AFE 45 as the white reference data for each pixel. Then, the CPU 40 sets the light amount adjustment value to cause the light source 30 to emit light of which light amount is ST, scans the image of the white reference plate 34, and obtains the scanned gradation values as confirmation data CK. Next, the CPU 40 determines whether the confirmation data CK includes 16 or more saturated pixels each exhibiting value of 255 (RA5).

When it is determined that the number of the saturated pixels included in the confirmation data CK is 16 or more (RA5: YES), the CPU 40 further determines whether the saturation flag is ON (RA6). When it is determined that the saturation flag is not ON (RA6: NO), the CPU 40 sets the saturation flag to be ON (RA7), and returns to RA1 to execute the light amount adjustment process again. When it is determined that the saturation flag is ON (RA6: YES), the CPU 40 sets the image processing device 46 to output the digital image data (RA8), and terminates the light amount adjustment process.

After the light amount adjustment process is terminated, in R8 (FIG. 6), the CPU 40 obtains the white reference data WB. That is, the CPU 40 adjusts the light amount adjustment value to cause the light source 30 to emit light of which light amount is ST, and scans the white reference plate 34. The CPU 40 obtains the digital image data of each pixel as the whit reference data WB. Then, the CPU 40 sets the thus obtained white reference data WB to the image processing device 46, and stores the same in the flash ROM 43.

The CPU 40 executes the scanning process (R9). That is, the CPU 40 sets setting values for outputting the gradation values to the image processing device 46. Then, the CPU 40 transmits a driving command to the driving circuit 47 to convey the original sheet GS. Next, the CPU 40 sets the light amount adjustment value which causes the light source 30 to emit light having the light amount ST, and scans the original sheet GS. Then, the CPU 40 obtains the gradation values as the scan data. When the scanning process (R9) is completed, the scanning main process is terminated.

<Light Amount Adjustment Process>

When the light amount adjustment process (R7) is started, the CPU 40 sets a setting value causing the image processing device 46 to output the average value AV to the image processing device 46 (FIG. 7) (RA1). With this setting, the average value of top 16 values of respective pixels within one line of black-compensated data KD is stored in the RAM 42.

The CPU 40 calculates the target value TG (RA2). That is, the CPU 40 extracts the maximum value from among the values of the black reference data KD for the pixel located at the pixel position Pmax as the maximum black data KM. Then, the CPU 40 subtract the value of the maximum black data KM from 255 which is the maximum gradation data of the digital image data to obtain the target value TG.

The CPU 40 sets the electrical current EC of the light source 30. That is, the CPU 40 sets the light amount adjustment value for turning on the light source 30 with the minimum electrical current value . . . . The CPU 40 adjusts the light amount adjustment value such that the electrical current value of the light source 30 increases stepwise to obtain the average value AV.

The CPU 40 increases the electrical current value until the average value AV exceeds the target value TG. When the average value AV exceeds the target value TG, the CPU 40 sets the electrical current value which is one step lower than the electrical current value when the average value AV exceeds the target value TG as the electrical current value EC. Step RA3 is executed for all the colors (i.e., three colors) of the light sources, respectively.

It is noted that the light amount of the light the light source 30 emits in accordance with the light amount adjustment value corresponding to the electrical current of EC during a turning-on period, in which the light source 30 can emit light, is light amount ST. According to the illustrative embodiment, an average value ranging between the average value AV obtained when the light source 30 is turned on with the electrical current when the average value exceeds the target value TG and the average value AV when the light source 30 is turned on with a one-step lower electrical value is regarded to be coincide with the target value TG.

FIG. 8 shows a flowchart illustrating an exemplary process of adjusting the electrical current EC executed in RA3 of FIG. 7. In the process shown in FIG. 8, the CPU 40 compares the average value AV and the target value TG (S01). When the average value AV is smaller than the target value TG, the CPU 40 proceeds to S02 and increases the electrical current value by one step. Then, the CPU 40 obtains the average value AV (S03) as described above, and returns to S01. When the average value AV is greater than the target value TG, the CPU 40 proceeds to S04 and decreases the electrical current value by one step. Then, the CPU 40 obtains the average value AV (S05), and returns to S01. When the average value AV is substantially equal to the target value TG, the CPU 40 proceeds to S06, where the electrical current value is determined as the electrical current EC. As described above, according to the illustrative embodiment, an initial value of the electrical current value is supposed to be set such that the average value AV is smaller than the target value TG, and then the electrical current value is increased step by step until the average value AV exceeds the target value TG. Therefore, the process shown in FIG. 8 can be modified as shown in FIG. 9.

In the modified process shown in FIG. 9, the CPU 40 compares the average value AV and the target value TG (S11). When the average value AV is not greater than the target value TG (i.e., the average value is equal to or smaller than the target value TG) (S11: YES), the CPU 40 proceeds to S12 and increases the electrical current value by one step. Then, the CPU 40 obtains the average value AV (S13) as described above, and returns to S11. When it is determined that the average value AV is greater than the target value TG (S11: YES), since it is the first time the average value AV exceeds the target value TG, the CPU 14 proceeds to S14 to decrease the electrical current value by one step, and determine the electrical current value as the electrical current EC (S15).

The CPU 40 obtains the confirmation data CV (RA4). That is, the CPU 40 sets the setting value causing the image processing device 46 to output the gradation value to the image processing device 46. The CPU 40 sets 255 to the image processing device 46 as the white reference data. Then, the CPU 40 causes the light source 30 to emit light having the light amount ST, and scans the white reference plate 34. Next, the CPU 40 obtains the gradation values of respective pixel in one line.

The CPU 40 determines whether the number of saturated pixels in the confirmation data CV is 16 or more, or less than 16 (RA5). That is, the CPU 40 counts the number of saturated pixels of which confirmation data CV is 255, which is the maximum value of the gradation value. When it is determined that there are 16 or more saturated pixels (RA5: YES), the CPU 40 proceeds to RA6 where the CPU 40 determines whether the saturation flag is on. When it is determined that the number of saturated pixels is less than 16 (RA5: NO), the CPU 40 proceeds to the scanning process (RA8).

In RA6, the CPU 40 determines whether the saturation flag is on. When it is determined that the saturation flag is on (RA6: YES), the CPU 40 proceeds to the scanning setting process (RA8). When it is determined that the saturation flag is not on (RA6: NO), the CPU 40 proceeds to RA7 where the saturation flag is set to be on. After execution of step RA7, the CPU 40 returns to RA1.

In RA8, the CPU 40 sets a setting value to output the digital image data to the image processing device 46. After execution of RA8, the CPU 40 terminates the light amount adjustment process (R7).

According to the above-described illustrative embodiment, the black compensator 51 calculates the black-compensated data KD by applying black compensation to the digital image data based on the black reference data KB. The comparator 53 and 16-pixel memory 54 stores the black-compensated data KD of sixteen pixels having 16 greatest values from among the pixels in one line. The averaging device 55 calculates the average value AV by averaging the values of the black-compensated data KD of the stored 16 pixels to obtain the average value AV. The current value adjustment process (RA3) obtains the average value AV with increasing the electrical current value of the light source 30 by one step until the average value AV exceeds the target value TG. When the average value AV exceeds the target value TG, the electrical current one step lower than the electrical current corresponding to the average value AV exceeding the target value TG is determined as the electrical current value EC. Therefore, even if the black reference data KB includes variations, the light amount can be determined with suppressing effects of the variations. Further, even if the black-compensated data KD includes abnormal values, effects of such abnormal values can be suppressed.

According to the illustrative embodiment, the greatest value of the black reference data KD of a pixel at the pixel position Pmax is extracted at the black maximum data KM, and the target value TG is calculated by subtracting the value of the black maximum data KM from the from 255 which is the maximum value of the gradation data of the digital image data in the process of calculating the target value TG (RA2). Therefore, the target value TG can be calculated accurately.

According to the illustrative embodiment, the comparator 53 stores the input black-compensated data KD in the 16-pixel memory 54 when the count value CD is 15 or less.

When the count value CD is greater than 15, the comparator 53 compares the input black-compensated data KD with the 16th greatest black-compensated data KD stored in the 16-pixel memory 54. When the input black-compensated data KD is greater than the 16th greatest black-compensated data KD stored in the 16-pixel memory 54, the comparator 53 replaces the 16th greatest black-compensated data KD with the input black-compensated data KD. When the input black-compensated data KD is equal to or less than the 16th greatest black-compensated data KD stored in the 16-pixel memory 54, the comparator 53 does not store the input black-compensated data KD. Therefore, it is sufficient that the 16-pixel memory 54, which stores the black-compensated data KD has a relatively small capacity.

It is noted that the image scanning apparatus 1, the scanning device 24 and the white reference plate 34 are examples of an image scanning apparatus, a scanning device and a reference member set forth in the claims, respectively.

Further, the AFE 45, the image processing device 46, and the device controller 44 are examples of a convertor, a compensator and a setting device set forth in the claims, respectively.

Further, the CPU 40 is an example of a controller set forth in the claims.

The black reference data KB obtaining process (R6) is an example of a black reference data obtaining process set forth in the claims.

The electric current adjusting process (RA3) is an example of a compensation data obtaining process and an adjusting process set forth in the claims.

Further, the scanning process (R9) is an example of a scanning process set forth in the claims.

The black compensator 51, the 16-pixel memory 54, the comparator 53, the averaging device 55, and the white compensator 52 are examples of a black compensator, a pixel storage device, a storage controller, an averaging device and a white compensator set forth in the claims, respectively.

Further, the process of obtaining the pixel position Pmax (R3) is an example of a position obtaining process set forth in the claims, and the process of calculating the target value TG (RA2) is an example of a target value calculating process set forth in the claims. Still further, the process of obtaining the confirmation data CV (RA4) is an example of a post-adjustment data obtaining process and a confirmation data calculating process. Further, the process of determining whether the number of saturated pixels is less than 16 or not (RA5) is a re-adjustment determining process set forth in the claims.

Furthermore, 16 greatest values stored in the 16-pixel memory and represent values among the values of the black-compensated data of one line are example of dimmed black-compensated data set forth in the claims.

<Modifications>

It is noted that aspects of the present disclosures should not be limited to those of the above-described illustrative embodiment, but can be modified in various ways without departing from the aspects of the disclosures as indicated below.

(1) It is noted that the image scanning apparatus 1 may be applied to an MFP (multi-function peripheral) provided with a printing device.

(2) According to the illustrative embodiment, the scanning apparatus 1 is provided with a single scanning device 24 and a single white reference member 34. Such a configuration may be modified such that the scanning apparatus 1 may have two scanning devices and two white reference plates configured to scan both sides of a single sheet.

(3) According to the illustrative embodiment, all the steps of the scanning main process and the light amount adjustment process are executed by the CPU 40. However, such a configuration can be modified in various ways. For example, a part of steps R3-R8 and/or a part of steps RA2-RA7 may be performed by the image processing device 46, the device controller 44 or the AFE 45.

(4) According to the illustrative embodiment, the light amount adjustment value (i.e., the electrical current value EC) is adjusted in the scanning main process. Such a configuration may be modified such that, for example, the light amount adjustment value may be calculated upon powering-on of the scanning apparatus, a preliminary user operation, shipping from a manufacturer and the like.

(5) According to the illustrative embodiment, the electrical current EC is used as the light amount adjustment value, but such a configuration can be modified. For example, the light-emitting period may be used as the light amount adjustment value.

What is claimed is:

1. A scanning apparatus, comprising:
    a reference member arranged on a conveying passage through which an original sheet subject to scan is conveyed;
    a scanning device configured to scan an image on the original sheet when the original sheet passes the reference member, the scanning device including a light source and a light receiver configured receive reflected light which is light emitted by the light source and reflected by the original sheet;
    a convertor configured to covert analog signals output by the scanning device into digital data for respective pixels in one line of the scanning device;
    a compensator configured to calculate compensation data based on the digital data and black reference data, the compensation data being data removing variation of the black reference data of respective pixels from the digital data;
    a setting device configured to set a light amount setting value used to adjust a light amount of the light emitted by the light source; and
    a controller,
    wherein the controller is configured to execute:
        a black reference data obtaining process in which the controller obtains the digital data by scanning the reference member with the light source turned off as the black reference data;

a compensated data obtaining process in which the controller obtains compensated data based on the digital data which is obtained by scanning the reference member according to the light amount setting value with the light source turned off, and the black reference data;

a light adjustment process in which the controller:

compares the compensated data with a first particular value and:

executes the compensated data obtaining process with setting the light amount adjustment value to be a smaller value when the compensated data is greater than the first particular value;

executes the compensated data obtaining process with setting the light amount adjustment value to be a greater value when the compensated data is less than the first particular value; and sets the light amount adjustment value to be a scan-time light amount adjustment value which is used for scanning when the light amount adjustment value is equal to the first particular value; and a scanning process in which the controller causes the light source to emit light according to the scan-time light amount adjustment value.

2. The image scanning apparatus according to claim 1, wherein the controller executes:

a position obtaining process in which the controller obtains positions of a particular number of pixels according to a descending order of values of the digital data obtained by scanning the reference member with causing the light source to emit light to the reference member as adjustment positions; and a target value calculation process in which the controller calculates the first particular value by subtracting the black reference data having a greatest value from among the black reference data of respective pixels at the adjustment positions from a particular maximum value of the digital data which is obtained when the reference member is scanned with causing the light source to emit light according to the scan-time light amount adjustment value.

3. The image scanning apparatus according to claim 2, wherein the compensator comprises:

a black compensator configured to calculate black-compensated data by subtracting the black reference data from the digital data;

a pixel storage device configured to store the black-compensated data as dimmed black-compensated data; and a storage controller configured to store the black-compensated data of the particular number of pixels from among the black-compensated data as the dimmed black-compensated data in the pixel storage device; and an averaging device configured to calculate the compensated data by averaging the dimmed black-compensated data of the particular number of pixels stored in the pixel storage device.

4. The image scanning apparatus according to claim 3, wherein the compensator comprises a counter configured to count a number of pieces of the digital data input to the compensator, wherein, upon every counting of the counter, the storage controller is configured to operate to:

when the number of the pieces of the digital data stored in the pixel storage device is equal to or less than the particular number of pixels, store the black-compensated data in the pixel storage device as the dimmed black-compensated data; and when the number of pieces of the digital data stored in the pixel storage device is greater than the particular number of pixels, compare the black-compensated data calculated by the compensator with N-th greatest dimmed black-compensated data stored in the pixel storage device, where N is the particular number of pixels, and store the black-compensated data calculated by the compensator to replace the N-th greatest dimmed black-compensated data when the black-compensated data is greater than the N-th greatest dimmed black-compensated data; and wherein the averaging device calculates the compensated data by averaging the particular number of pieces of dimmed black-compensated data stored in the pixel storage device when the counter counts all the pixels of one line.

5. The image scanning apparatus according to claim 3, wherein the compensator comprises a white compensator configured to calculate white-compensated data by applying white compensation to the black-compensated data based on white reference data, and wherein the controller is configured to further execute:

a post-adjustment data obtaining process in which the controller causes the black compensator to obtain black-compensated confirmation data based on the black reference data and the digital data which is obtained by scanning the reference member with turning on the light source in accordance with the light amount setting value which has been adjusted in the adjustment process;

a confirmation data calculation process in which the controller obtains the confirmation data by causing the white compensator to apply white compensation to the black-compensated confirmation data with using the particular value as the white reference data for respective pixels; and a re-adjustment determination process in which the controller re-executes the adjustment process when a number of pieces of saturation confirmation data is greater than the particular number of the pixels.

* * * * *